US006971807B2

(12) United States Patent
Tsai et al.

(10) Patent No.: US 6,971,807 B2
(45) Date of Patent: Dec. 6, 2005

(54) WATERPROOF KEYBOARD

(75) Inventors: Ching-Cheng Tsai, Keelung (TW); Ching-Cheng Cheng, Sinjhuang (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/718,796

(22) Filed: Nov. 24, 2003

(65) Prior Publication Data
US 2005/0013645 A1   Jan. 20, 2005

(51) Int. Cl.[7] .............................. B41J 5/08; B41J 5/10
(52) U.S. Cl. .................. 400/472; 400/490; 400/495; 361/680; 200/302.1; 341/22
(58) Field of Search ........................ 200/5, 344, 345, 200/314; 400/490, 491, 495, 496, 472; 361/680

(56) References Cited
U.S. PATENT DOCUMENTS 5,397,867 A * 3/1995 Demeo .................. 200/5 A
5,793,605 A * 8/1998 Sellers ................... 361/680
6,252,184 B1 * 6/2001 Tsai et al. ............... 200/5 A
6,550,993 B2 * 4/2003 Lu et al. .................. 400/490

* cited by examiner

Primary Examiner—Ren Yan
Assistant Examiner—Marissa Ferguson
(74) Attorney, Agent, or Firm—Arent Fox PLLC

(57) ABSTRACT

A waterproof keyboard is provided, which has keys, scissor frames, elastic layer bodies, a membrane circuit board, a support plate and a bottom plate, wherein the bottom board is disposed with a plurality of stamped nodes, which are corresponded by apertures disposed on the support plate. The means of riveting is used for riveting the bottom plate and the support plate, such that no apertures can be found on the bottom plate, so as to prevent liquids poured on the keyboard by accident from infiltrating down to the motherboard underneath the bottom plate, thus assuring that the motherboard is not damaged thereby. As a result, the computer can be kept operable. Also the membrane circuit board is mounted on top of the support plate, thus rendering the overall structural assembly easier and such overall structure more stable.

14 Claims, 10 Drawing Sheets

WATERPROOF KEYBOARD

BACKGROUND OF THE INVENTION

1. Field of the Invention

The present invention relates to a keyboard assembly structure, more particularly, a keyboard having the waterproof function.

2. Description of the Related Art

A common notebook computer 10 is shown in FIG. 5, which comprises a panel 20, a keyboard 30 and a base 40, wherein the panel 20 and the base 40 are hinged to be integrally connected. The keyboard 30 is mounted on the base 40, wherein a motherboard adhered with electronic members such as a CPU on the surface thereof is contained. The motherboard is located underneath the keyboard 30.

As shown in FIG. 6 to FIG. 10, the keyboard 30 comprises a plurality of keys 31, an elastic layer 33 located underneath the plurality of keys 31 for carrying and fixating the plurality of keys 31, a circuit board layer 34 mounted underneath the elastic layer 33, and a bottom plate 35 located underneath the circuit board layer 34 for fixating the keys 31, the elastic layer 33 and the circuit board layer 34, with flanges 37 disposed on four sides thereof.

The bottom plate 35 is distributed with a plurality of apertures 36 formed by stamping (Referring to FIG. 8), a process during which lugs (Not shown in drawings) are formed for fixating the keys 31, the elastic layer 33 and circuit board layer 34. The elastic layer 33 and the circuit board layer 34 are respectively disposed with holes to correspond to the apertures 36 of the bottom plate 35, such that the keys 31, the elastic payer 33 and the circuit board layer 34 can be engaged and fixated by lugs mounted on the bottom plate 35 so as to be integrally formed. The bottom plate 35 is further disposed with a number of screws (Not shown in drawings) for locking the keyboard 30 onto the base 40 and keeping certain distance between the keyboard 30 and the motherboard in the base 40.

The composition of the keyboard is of conventional technology that requires no further elaboration here.

Since the user operates the computer by pressing and punching the keys 31, the bottom plate 35 that carries the keys 31, the elastic layer 33 and the circuit board layer 34 should be made of hard and tough material, such as metal, so as to sustain the force from the user and prevent the keyboard 30 from being bent and deformed.

SUMMARY OF THE INVENTION

Stamped apertures are required to be formed on the conventional bottom plate by stamping for lugs to go through, engage and fixate the keys, the elastic layer and the circuit board. The bottom plate is distributed with a plurality of apertures. Therefore, as the user accidentally causes liquid to be poured into the keyboard, such liquid would flow downwardly along the apertures of the keyboard to the motherboard underneath the keyboard, thus causing damage to the motherboard and rendering the keyboard inoperable.

One of the object of the present invention is to provide a waterproof keyboard, whereby the stamped nodes on the bottom plate is riveted with apertures of the support plate, thus causing no apertures on the bottom plate so as to prevent the motherboard underneath the bottom plate of the keyboard from being damaged by accidental infiltration of liquid into the keyboard.

Another object of the present invention is to provide a waterproof keyboard, whereby the bottom plate is riveted with the support plate, causing the membrane circuit board to be placed on top of the support plate, thus enabling the membrane circuit board to provide the effects of easier and more stable assembly of the overall structure.

Yet another object of the present invention is to provide a waterproof keyboard, whereby the stamped nodes on the bottom plate are riveted with apertures of the membrane circuit board and the support plate, causing no apertures on the bottom plate, thus preventing the motherboard from being damaged by accidental infiltration of liquid into the keyboard.

The keyboard that achieves the foregoing objects comprises keys disposed with upper fixation portions respectively on two lower sides thereof, scissor frames disposed with upper pivot portions and lower pivot portions, elastic bodies having contact press portions, a membrane circuit board having a first pierce hole, a support plate having a first aperture and a lower fixation portion, and a bottom plate having a plurality of stamped nodes which go through the corresponding first apertures of the support plate. The bottom plate and the support plate are jointed by riveting. The membrane circuit board is placed on top of the support plate.

The first apertures of the support plate are further disposed with at least one notch respectively.

The upper surface of the membrane circuit can be printed with black or dark printing surface.

The first apertures of the support plate can be round-shaped.

The membrane circuit board consists of an upper, a middle and a lower circuit boards.

BRIEF DESCRIPTION OF THE DRAWINGS

These and other features, aspects and advantages of the present invention will become better understood with regard to the following description, appended claims and accompanying drawings that are provided only for further elaboration without limiting or restricting the present invention, where:

DETAILED DESCRIPTION OF THE PREFERRED EMBODIMENT

The following is a detailed description of the best presently known modes of carrying out the inventions. This description is not to be taken in a limiting sense, but is made merely for the purpose of illustrating the general principles of the inventions.

Figure 1:
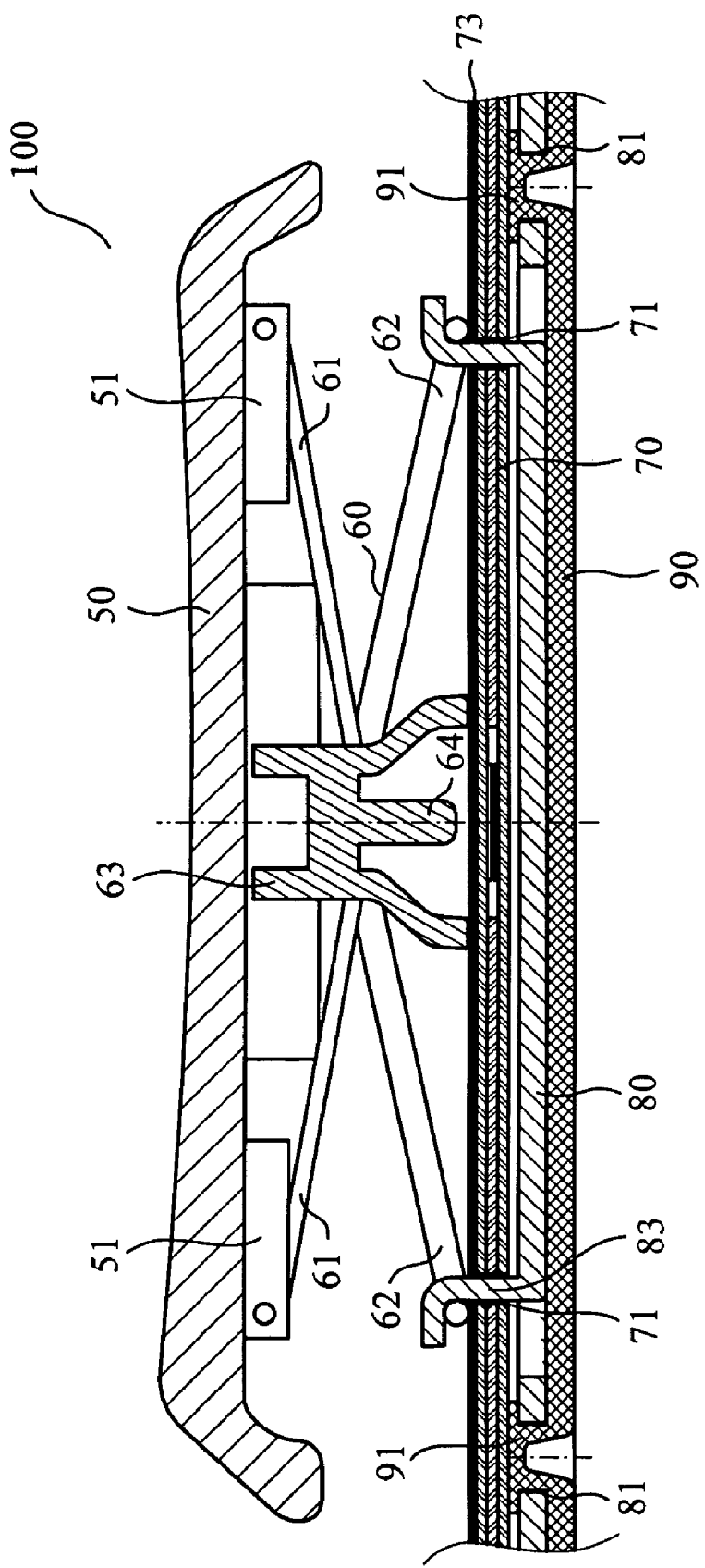
FIG. 1 shows a side sectional view of a waterproof keyboard of the preferred embodiment in the present invention.

Please refer to FIG. 1, wherein a side sectional view of a waterproof keyboard of the preferred embodiment in the present invention is shown. The waterproof keyboard 100 of the present invention comprises keys 50 with both sides thereunder being disposed respectively with an upper fixation portion 51, scissor frames 60 having an upper pivot portion 61 and a lower pivot portion 62 respectively, elastic contact bodies 63 having a contact press portion 64 respectively, a membrane circuit board 70 consisting of an upper, a middle and a lower layer of circuit board with a first through hole 71 disposed thereon, such membrane circuit board 70 being printed on top thereof with a black or dark printing surface 73, a support plate disposed with a first aperture 81 and a lower fixation portion 83, and a bottom plate 90 disposed with a plurality of stamped nodes 91.

Please continue referring to FIG. 1. The upper pivot portion 61 on the scissor frame 60 is pivotally connected with the upper fixation portion 51 on the key 50. The elastic contact body 63 is disposed between the key 50 and the membrane circuit board 70, whereon the printing surface 73 gives the membrane circuit board 70 the light-blocking effect. The lower fixation portion 83 of the support plate 80 is to engage with the lower pivot portion 62 of the scissor frame 60 via the first through hole 71 going through the membrane circuit board 70, and the support plate 80 is to connect with the stamped nodes 91 of the bottom plate 90 via the first aperture 81, so as to complete the waterproof keyboard 100 of the present invention.

Figure 2A:
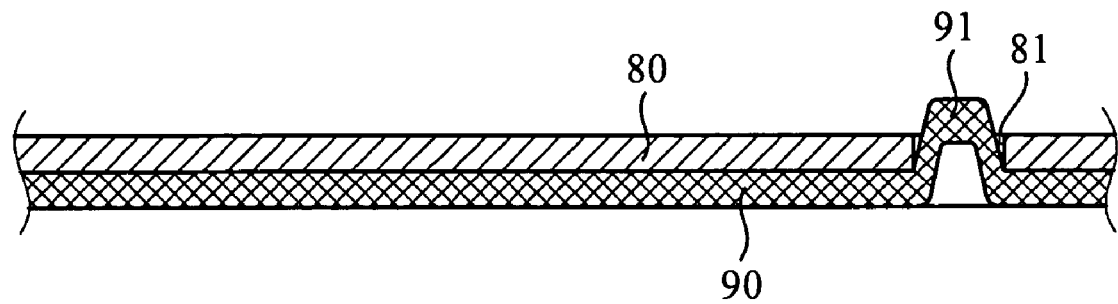
FIG. 2A shows a side sectional view of the unassembled bottom plate and support plate in the waterproof keyboard of the present invention.
Figure 2B:
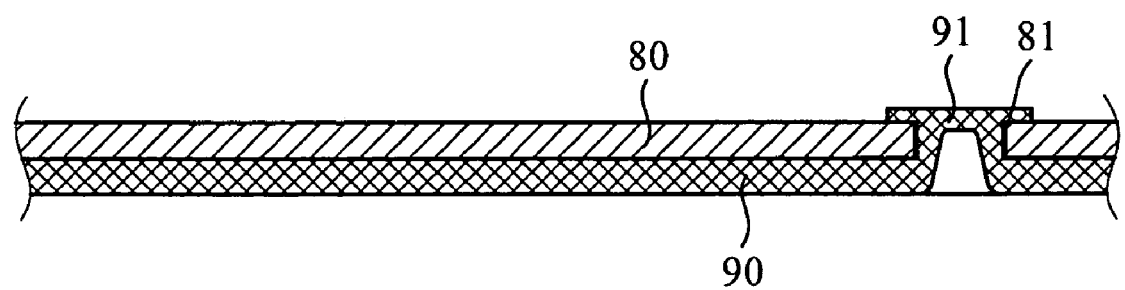
FIG. 2B shows a side sectional view of the assembled bottom plate and support plate in the waterproof keyboard of the present invention.

Please refer to FIGS. 2A and 2B showing a partial side sectional view of the bottom plate 80 and support plate 90 in the waterproof keyboard 100 of the present invention, wherein, with the structures of key 50, the scissor frame 60, the elastic contact body 63 and the membrane circuit board 70 being omitted, a bottom plate 90 disposed with a plurality of stamped nodes 91, and a support plate 80 disposed with a first aperture 81 corresponding to the stamped nodes 91 are included.

Please continue referring to FIGS. 2A and 2B, wherein FIG. 2A shows a side sectional view of the unassembled bottom plate and support plate in the waterproof keyboard of the present invention. The support plate 80 is disposed on top of the bottom plate 90 with the stamped nodes 91 of the bottom plate 90 going through the first aperture 81 of the support plate 80, thereafter the stamped nodes 91 of the bottom plate 90 are riveted onto both sides of the first aperture 81 of the support plate 80, such that the riveted structure is completed as shown in FIG. 2B.

Figure 3A:
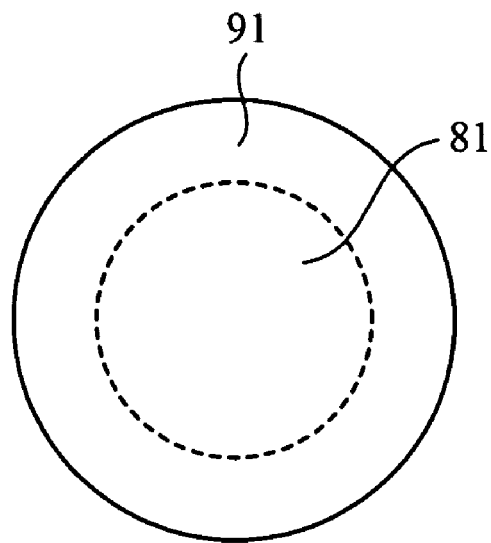
FIG. 3A shows a top plan view of the bottom plate and supporting plate in the waterproof keyboard of the present invention being riveted.

Please refer to FIG. 3A, which shows a top plan view of the bottom plate 90 and support plate 80 in the waterproof keyboard 100 of the present invention being riveted. The first aperture 81 of the support plate 80 is formed as a round shape body such that after being riveted, the stamp node 91 is completely covered by and adhered to the first aperture 81, and thus the bottom plate 90 and the support plate 80 are connected.

Figure 3B:
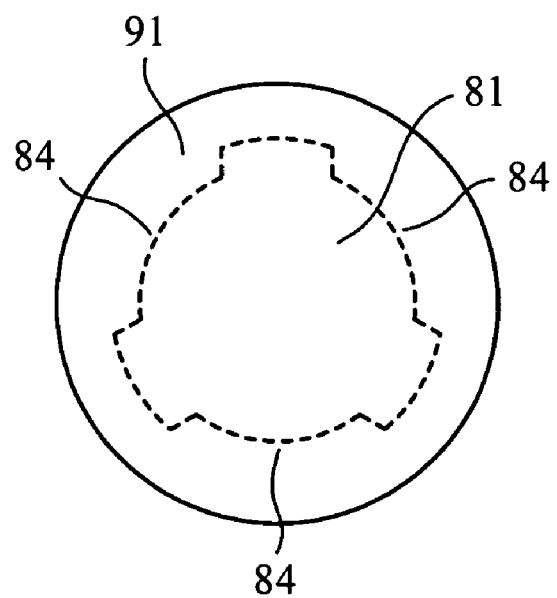
FIG. 3B shows a top plan view of the preferred embodiment for bottom plate and supporting plate in the waterproof keyboard of the present invention being riveted.

Please continue referring to FIG. 3B, which shows a top plan view of the preferred embodiment for the bottom plate 90 and the support plate 80 in the waterproof keyboard 100 of the present invention being riveted. A plurality of notches 84 is mounted on the first aperture 81 of the support plate 80, such that as the support plate 80 is riveted to the bottom plate 90, the bottom plate 90 is adhered to the support plate 80 at the area thereof between the first aperture 81 and the notches 84 of the first aperture 81. Consequently the riveting between the support plate 80 and the bottom plate 90 can be further fixated without being easily loosened.

According to the structure provided by the present invention, the riveting between the stamped node of the bottom plate and the aperture of the support plate, no apertures will be formed on the bottom plate, therefore as any liquid is accidentally poured into the keyboard, the motherboard underneath the keyboard shall not be damaged. Further, with the riveting between the bottom plate and the support plate, the membrane circuit board can be placed on top of the support plate, thus rendering the overall structural assembly easier and such overall structure more stable.

Figure 4:
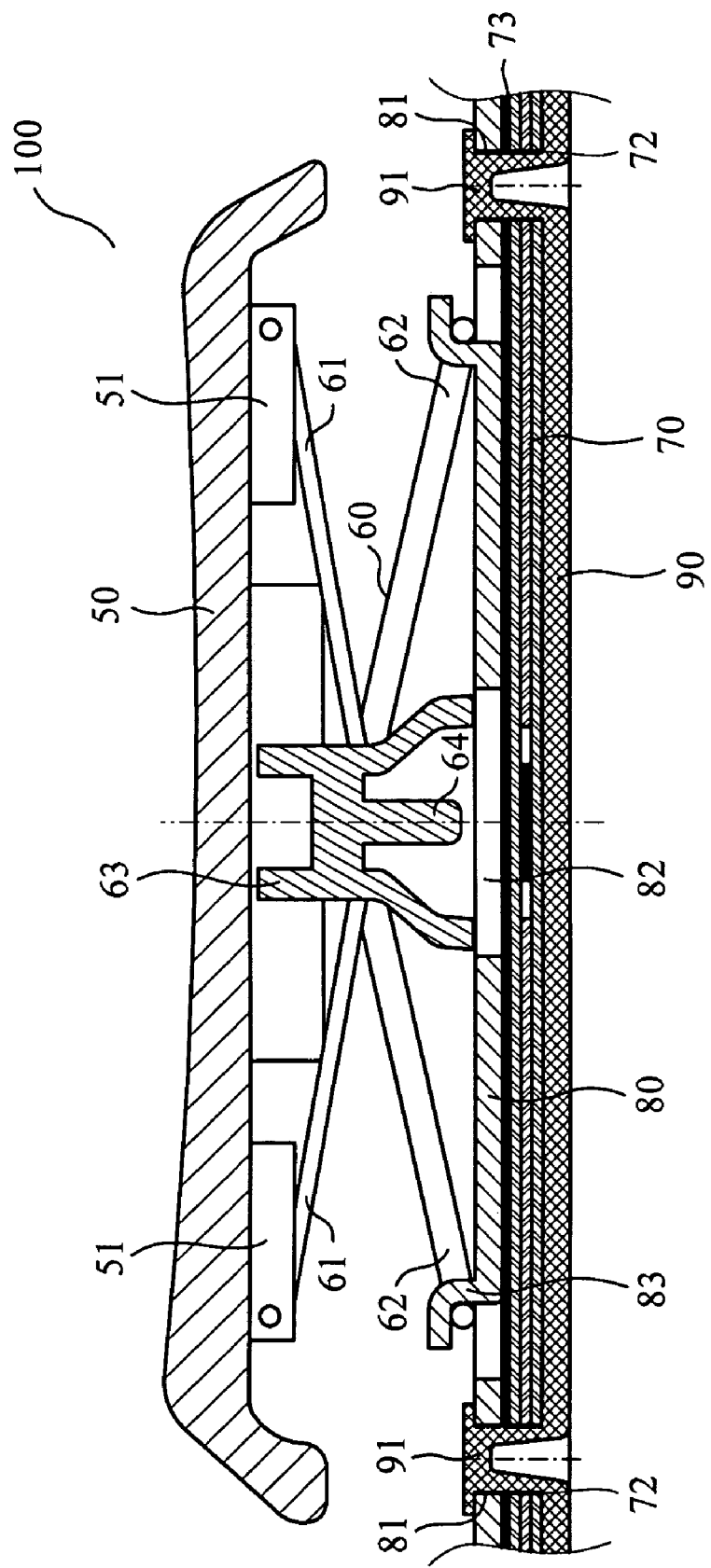
FIG. 4 shows a side view of another embodiment for the waterproof keyboard of the present invention.
Figure 5:
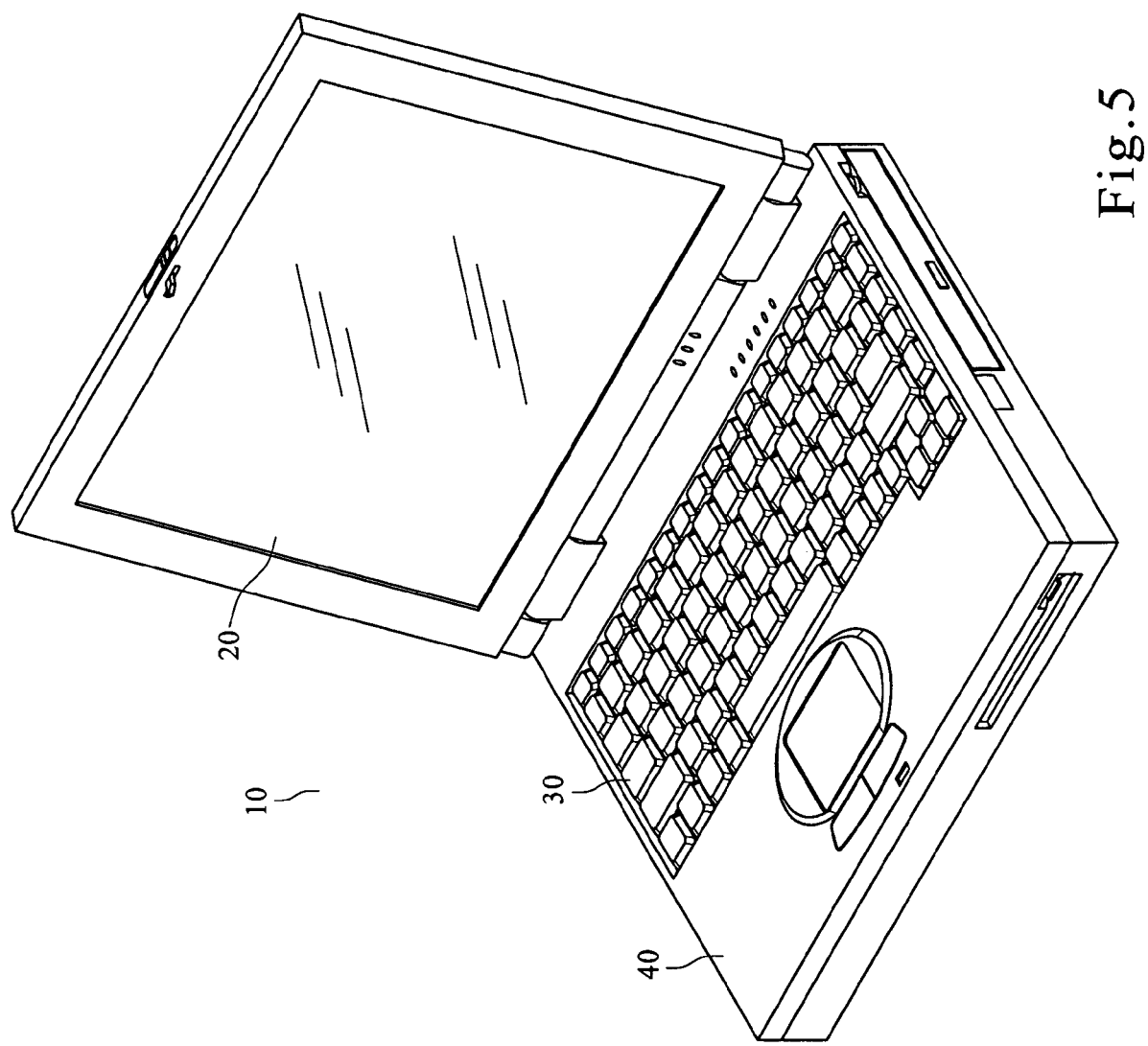
FIG. 5 shows a three-dimensional view of a notebook computer being opened.
Figure 6:
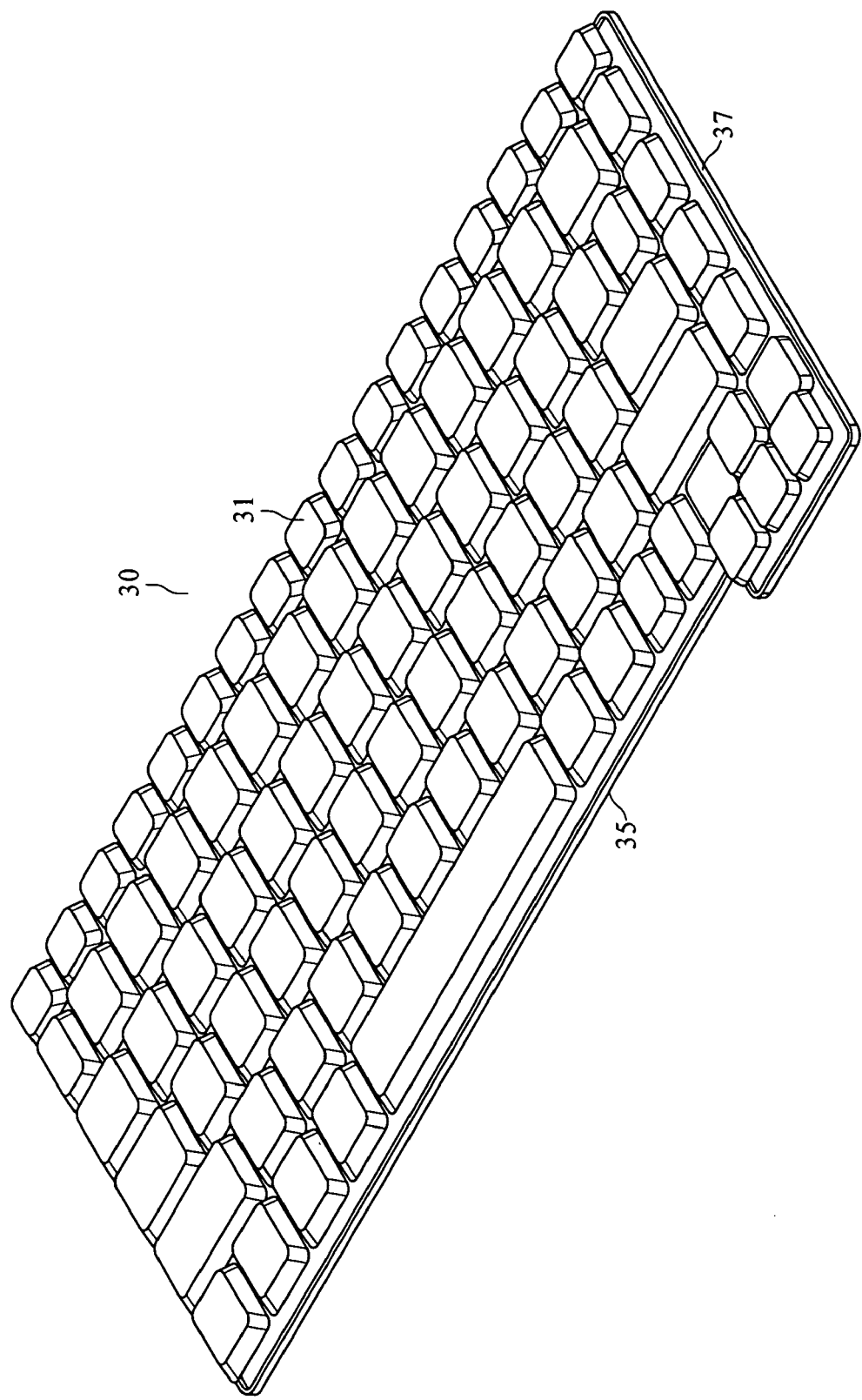
FIG. 6 shows a three-dimensional view of the conventional keyboard being used in the notebook computer shown in FIG. 5.
Figure 7:
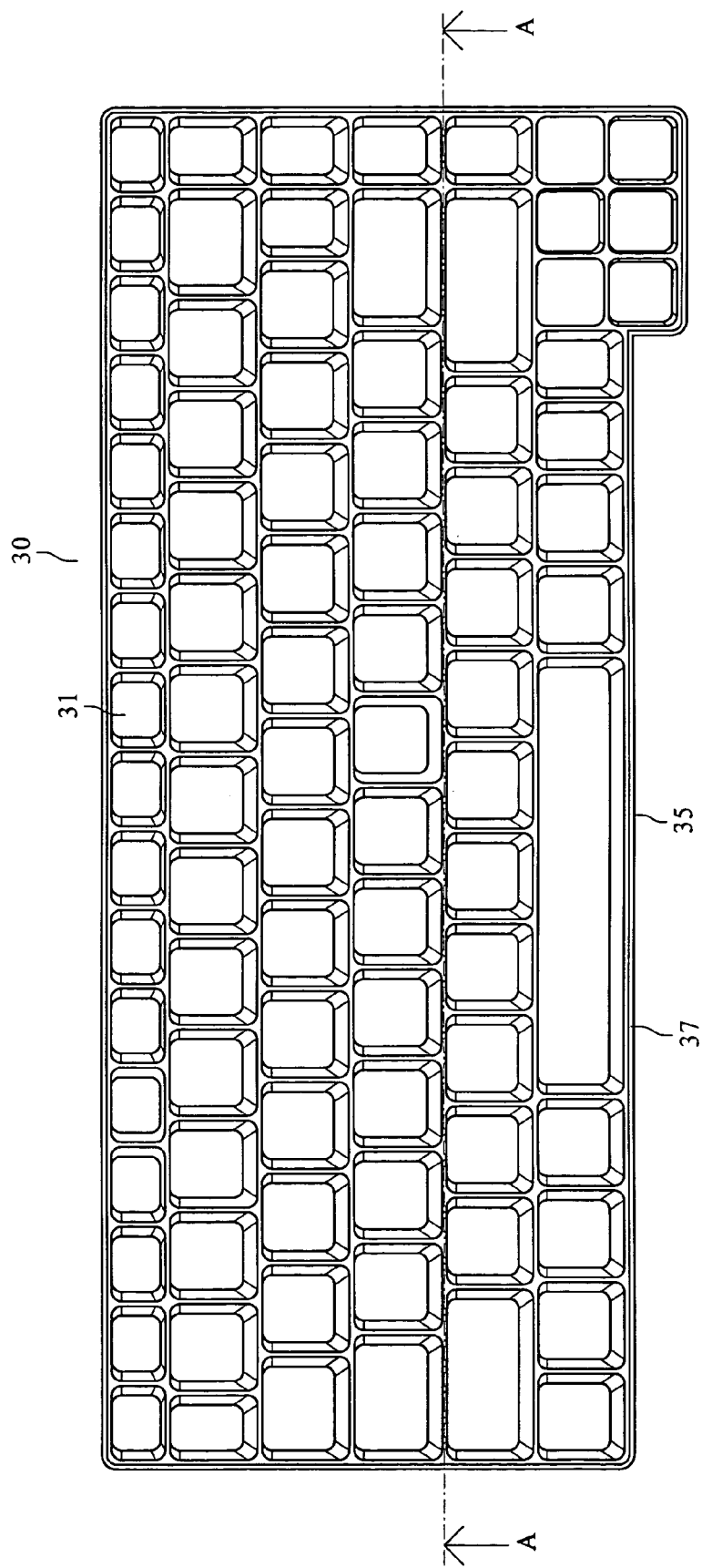
FIG. 7 shows a top plan view of the keyboard shown in FIG. 6.
Figure 8:
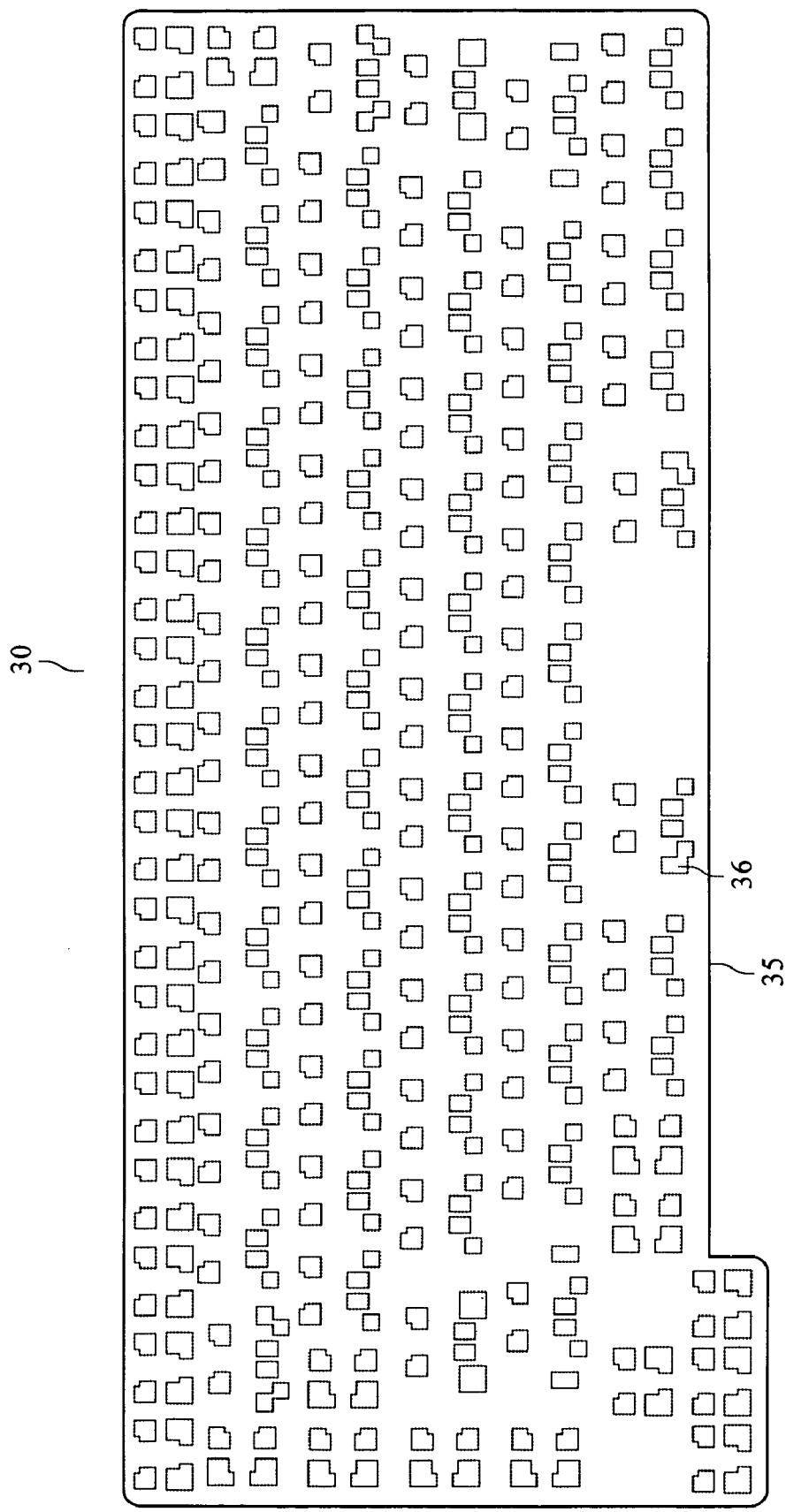
FIG. 8 shows a bottom plan view of the keyboard shown in FIG. 6.
Figure 9:
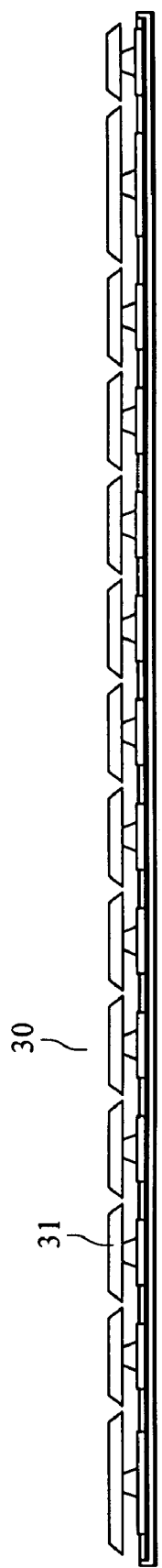
FIG. 9 shows a sectional structural view along the line A–A in FIG. 7.
Figure 10:
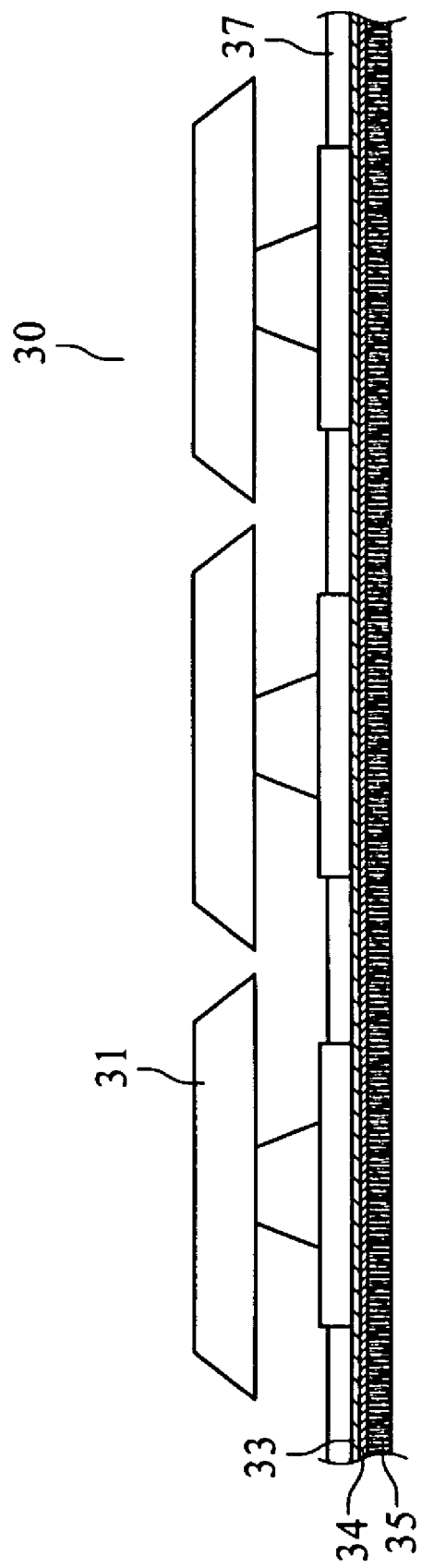
FIG. 10 shows a partially enlarged sectional structural view shown in FIG. 9.

Please refer to FIG. 4, which shows a side view of another embodiment for the waterproof keyboard 100 of the present invention. The waterproof keyboard of the present invention comprises a key 50 with both lower sides thereof being disposed with an upper fixation portion 51 respectively, a scissor frame 60 disposed with an upper pivot portion 61 and a lower pivot portion 62, an elastic contact body 63 disposed with a contact press portion 64, a support plate 80 having a first aperture 81, a second aperture 82 and a lower fixation portion 83, a membrane circuit board 70 having a second pierce hole 72 and being printed on top thereof with a black or dark printing surface 73, and a bottom plate 90 having a plurality of stamped nodes 91.

Please continue referring to FIG. 4. The upper pivot portion 61 of the scissor frame 60 is pivotally connected with the upper fixation portion 51 of the key 50, whereas the lower pivot portion 62 of the scissor frame 60 is engaged with the lower fixation portion 83 of the support plate 80. The elastic contact body 63 is placed between the key 50 and the support plate 80, whereas the membrane circuit board 70 is placed between the support plate 80 and the bottom plate 90, with the printing surface 73 covering on top of the membrane circuit board 70, so as to provide the membrane circuit board 70 with light-blocking function. As the key 50 is pressed, the motion of the scissor frame 60 causes the elastic contact body 63 to press downwardly, and the contact press portion 64 of the elastic contact portion 63 is to contact and press the membrane circuit board 70 via the second aperture 82 of the support plate 80. Then the means of riveting, as provided in FIGS. 2A and 2B of the preferred embodiment, is employed whereby, after the stamped node 91 of the bottom plate 90 going through the second through hole 72 of the membrane circuit board 70 and the second aperture 81 of the support plate 80, the stamped node 91 of the bottom plate 90 is riveted onto the support plate 80, thus completing the assembly of the keyboard 100 of the present invention.

Although the present invention has been described in considerable detail with reference to certain preferred embodiments thereof, those skilled in the art can easily understand that all kinds of alterations and changes can be made within the spirit and scope of the appended claims. For example, a light-blocking plate can be further added onto the keyboard 100 of the present invention. Therefore, the spirit and scope of the appended claims should not be limited to the description of the preferred embodiments contained herein.

What is claimed is:

1. A waterproof keyboard, comprising:
   keys each of which having two lower sides disposed with an upper fixation portion respectively;
   scissor frames each of which disposed with an upper pivot portion and a lower pivot portion respectively;
   elastic contact bodies each of which having a contact press portion;
   a membrane circuit board having a first through hole;
   a support plate having first apertures and a lower fixation portion; and
   a bottom plate having a plurality of stamped nodes;
   wherein said membrane circuit board is placed on top of said support plate, said bottom plate is placed underneath said support plate, said stamped nodes of said bottom plate go through said first apertures of said support plate respectively such that said bottom plate and said support plate is riveted and no apertures are formed on said bottom plate.

2. The waterproof keyboard as in claim 1, wherein a light-blocking plate is further disposed.

3. The waterproof keyboard as in claim 1, wherein said membrane circuit board is consisted of an upper layer, a middle layer and a lower layer of circuit boards.

4. The waterproof keyboard as in claim 3, wherein a black or dark printing surface is printed on top of said membrane circuit board.

5. The waterproof keyboard as in claim 1, wherein said first apertures of said support plate are formed as round shape bodies.

6. The waterproof keyboard as in claim 1, wherein said first apertures of said support plate are disposed with a plurality of notches respectively.

7. A waterproof keyboard, comprising:
   keys;
   scissor frames;
   elastic contact bodies;
   a support plate having first apertures;
   a membrane circuit board having a second through hole; and
   a bottom plate having a plurality of stamped nodes;
   wherein said membrane circuit board is placed between said bottom plate and said support plate, said stamped nodes of said bottom plate respectively go through said second through holes of said membrane circuit board and said first apertures of said support plate such that said bottom plate, said membrane circuit board and said support plate are riveted and no apertures are formed on said bottom plate.

8. The waterproof keyboard as in claim 7, wherein upper fixation portions are respectively disposed on two lower sides of said keys.

9. The waterproof keyboard as in claim 7, wherein said scissor frames are disposed with upper pivot portions and lower pivot portions respectively.

10. The waterproof keyboard as in claim 7, wherein said elastic contact bodies are disposed with contact press portions respectively.

11. The waterproof keyboard as in claim 7, wherein a light-blocking plate is further disposed.

12. The waterproof keyboard as in claim 7, wherein said support plate is further disposed with a second aperture and a lower fixation portion.

13. The waterproof keyboard as in claim 7, wherein said membrane circuit board is consisted of an upper layer, a middle layer and a lower layer of circuit boards.

14. The waterproof keyboard as in claim 13, wherein a black or dark printing surface is printed on top of said membrane circuit board.

* * * * *